(12) United States Patent
Henry et al.

(10) Patent No.: US 8,432,300 B2
(45) Date of Patent: Apr. 30, 2013

(54) KEYPAD MEMBRANE SECURITY

(75) Inventors: Chris Henry, Sydney (AU); William Shumate, Tempe, AZ (US)

(73) Assignee: Hypercom Corporation, Scottsdale, AZ (US)

( * ) Notice: Subject to any disclaimer, the term of this patent is extended or adjusted under 35 U.S.C. 154(b) by 421 days.

(21) Appl. No.: 12/748,198

(22) Filed: Mar. 26, 2010

(65) Prior Publication Data
US 2010/0328113 A1 Dec. 30, 2010

Related U.S. Application Data

(60) Provisional application No. 61/163,785, filed on Mar. 26, 2009.

(51) Int. Cl.
*H03M 11/00* (2006.01)
(52) U.S. Cl.
USPC .............................................. 341/24; 341/20
(58) Field of Classification Search ............. 341/20, 341/24; 235/494; 200/61.93
See application file for complete search history.

(56) References Cited

U.S. PATENT DOCUMENTS

| | | | |
|---|---|---|---|
| 3,398,233 A | 8/1968 | de Lizasoain et al. |
| 3,466,643 A | 9/1969 | Moorefield |
| 3,735,353 A | 5/1973 | Donovan et al. |
| 3,818,330 A | 6/1974 | Hiroshima et al. |
| 3,988,551 A | 10/1976 | Larson |
| 4,486,637 A | 12/1984 | Chu |
| 4,527,030 A | 7/1985 | Oelsch |
| 4,593,384 A | 6/1986 | Kleijne |
| 4,691,350 A | 9/1987 | Kleijne et al. |
| 4,694,126 A | 9/1987 | Aiken, Jr. et al. |
| 4,749,368 A | 6/1988 | Mouissie |
| 4,807,284 A | 2/1989 | Kleijne |
| 4,811,288 A | 3/1989 | Kleijne et al. |
| 4,847,595 A | 7/1989 | Okamoto |

(Continued)

FOREIGN PATENT DOCUMENTS

| | | |
|---|---|---|
| AU | 781587 | 12/2001 |
| CA | 2349145 | 12/2001 |

(Continued)

OTHER PUBLICATIONS

International Preliminary Report on Patentability issued Oct. 6, 2011 from corresponding International Application No. PCT/US2010/028920, 6 pages.

(Continued)

*Primary Examiner* — Brian Young
(74) *Attorney, Agent, or Firm* — Stein IP, LLC

(57) ABSTRACT

In an exemplary embodiment, a security sensor is present in a POS terminal between the keypad and a processor. The security sensor is configured to detect an unauthorized probe through the keypad and implement a security protocol. In an exemplary embodiment, the security sensor is a serpentine conductive circuit screen printed on the polyester film. The serpentine conductive circuit may cover almost all of the polyester film. For example, the serpentine conductive circuit may cover 90% to 100% of the film. Furthermore, in an exemplary embodiment, the serpentine conductive circuit limited to a section of the polyester film. For example, the serpentine conductive circuit may be on only ¼ of the film. This embodiment has the advantage of printing the serpentine conductive circuit on the critical security areas and leaving the non-critical areas with blank polyester film.

15 Claims, 12 Drawing Sheets

U.S. PATENT DOCUMENTS

| | | | |
|---|---|---|---|
| 5,086,292 | A | 2/1992 | Johnson et al. |
| 5,117,457 | A | 5/1992 | Comerford et al. |
| 5,233,505 | A | 8/1993 | Chang et al. |
| 5,237,307 | A | 8/1993 | Gritton |
| 5,239,664 | A | 8/1993 | Verrier et al. |
| 5,353,350 | A | 10/1994 | Unsworth et al. |
| 5,506,566 | A | 4/1996 | Oldfield et al. |
| 5,559,311 | A | 9/1996 | Gorbatoff |
| 5,586,042 | A | 12/1996 | Pisau et al. |
| 5,627,520 | A | 5/1997 | Grubbs et al. |
| 5,657,052 | A | 8/1997 | Lerude |
| 5,675,319 | A | 10/1997 | Rivenberg et al. |
| 5,790,670 | A | 8/1998 | Bramlett |
| 5,829,579 | A | 11/1998 | Tsai |
| 5,861,662 | A | 1/1999 | Candelore |
| 5,877,547 | A | 3/1999 | Rhelimi |
| 5,998,858 | A | 12/1999 | Little et al. |
| 6,245,992 | B1 | 6/2001 | Hou |
| 6,288,640 | B1 | 9/2001 | Gagnon |
| 6,355,316 | B1 | 3/2002 | Miller et al. |
| 6,359,338 | B1 | 3/2002 | Takabayashi |
| 6,396,400 | B1 | 5/2002 | Epstein, III et al. |
| 6,414,884 | B1 | 7/2002 | Defelice et al. |
| 6,438,825 | B1 | 8/2002 | Kuhn |
| 6,463,263 | B1 | 10/2002 | Feilner et al. |
| 6,466,118 | B1 | 10/2002 | Van Zeeland et al. |
| 6,512,454 | B2 | 1/2003 | Miglioli et al. |
| 6,548,767 | B1 | 4/2003 | Lee et al. |
| 6,563,488 | B1 | 5/2003 | Rogers et al. |
| 6,646,565 | B1 | 11/2003 | Fu et al. |
| 6,669,100 | B1 | 12/2003 | Rogers et al. |
| 6,710,269 | B2 | 3/2004 | Kunigkeit et al. |
| 6,830,182 | B2 | 12/2004 | Izuyama |
| 6,853,093 | B2 | 2/2005 | Cohen et al. |
| 6,874,092 | B1 | 3/2005 | Motoyama et al. |
| 6,912,280 | B2 | 6/2005 | Henry |
| 6,917,299 | B2 | 7/2005 | Fu et al. |
| 6,921,988 | B2 | 7/2005 | Moree |
| 6,936,777 | B1 | 8/2005 | Kawakubo |
| 7,049,970 | B2 | 5/2006 | Allen et al. |
| 7,054,162 | B2 | 5/2006 | Benson et al. |
| 7,170,409 | B2 | 1/2007 | Ehrensvard et al. |
| 7,224,600 | B2 | 5/2007 | McClure |
| 7,238,901 | B2 | 7/2007 | Kim et al. |
| 7,247,791 | B2 | 7/2007 | Kulpa |
| 7,270,275 | B1 * | 9/2007 | Moreland et al. ............. 235/492 |
| 7,283,066 | B2 | 10/2007 | Shipman |
| 7,301,460 | B2 | 11/2007 | Coste |
| 7,346,783 | B1 | 3/2008 | Carrico et al. |
| 7,497,378 | B2 | 3/2009 | Aviv |
| 7,784,691 | B2 | 8/2010 | Mirkazemi-Moud et al. |
| 7,832,628 | B2 * | 11/2010 | Mittler .......................... 235/379 |
| 7,843,339 | B2 | 11/2010 | Kirmayer |
| 7,898,413 | B2 | 3/2011 | Hsu et al. |
| 2003/0025617 | A1 | 2/2003 | Kunigkeit |
| 2004/0031673 | A1 | 2/2004 | Levy |
| 2004/0118670 | A1 | 6/2004 | Park et al. |
| 2004/0120101 | A1 | 6/2004 | Cohen et al. |
| 2005/0081049 | A1 | 4/2005 | Nakayama et al. |
| 2005/0184870 | A1 | 8/2005 | Galperin et al. |
| 2006/0049255 | A1 | 3/2006 | Von Mueller et al. |
| 2006/0049256 | A1 | 3/2006 | Von Mueller et al. |
| 2006/0192653 | A1 | 8/2006 | Atkinson et al. |
| 2006/0201701 | A1 | 9/2006 | Coleman et al. |
| 2007/0040674 | A1 * | 2/2007 | Hsu .......................... 340/539.31 |
| 2007/0102272 | A1 | 5/2007 | Sano et al. |
| 2007/0152042 | A1 | 7/2007 | Mittler |
| 2007/0177363 | A1 | 8/2007 | Jayanetti |
| 2007/0204173 | A1 | 8/2007 | Kuhn |
| 2008/0180245 | A1 | 7/2008 | Hsu et al. |
| 2008/0278353 | A1 * | 11/2008 | Smith et al. ..................... 341/22 |
| 2009/0058628 | A1 | 3/2009 | Kirmayer et al. |
| 2009/0184850 | A1 | 7/2009 | Schulz et al. |
| 2011/0063109 | A1 | 3/2011 | Ostermüller |
| 2011/0215938 | A1 | 9/2011 | Neo et al. |
| 2011/0248860 | A1 | 10/2011 | Avital et al. |
| 2012/0025983 | A1 | 2/2012 | Ben-Zion et al. |
| 2012/0106113 | A1 | 5/2012 | Kirmayer et al. |
| 2012/0180140 | A1 | 7/2012 | Barrowman |

FOREIGN PATENT DOCUMENTS

| | | |
|---|---|---|
| DE | 2 241 738 | 8/1974 |
| DE | 19705518 | 8/1998 |
| DE | 601 01 096 | 7/2004 |
| EP | 0 375 545 | 6/1990 |
| EP | 0408401 | 1/1991 |
| EP | 0495645 | 7/1992 |
| EP | 1126358 | 8/2001 |
| EP | 1160647 | 12/2001 |
| EP | 1 421 549 | 5/2004 |
| EP | 1421549 | 5/2004 |
| EP | 1 432 031 | 6/2004 |
| EP | 1432031 | 6/2004 |
| EP | 1 676 182 | 7/2006 |
| EP | 1676182 | 7/2006 |
| GB | 892198 | 3/1962 |
| GB | 1 369 739 | 10/1974 |
| GB | 8608277 | 2/1987 |
| GB | 2372363 | 8/2002 |
| GB | 2411756 | 9/2006 |
| JP | 2002108711 | 4/2002 |
| WO | 01/63994 | 8/2001 |
| WO | 2005/086546 | 9/2005 |
| WO | 2010/082190 | 7/2010 |

OTHER PUBLICATIONS

PCT International Search Report and Written Opinion issued Aug. 19, 2010 for International Application No. PCT/US2010/028920, 10 pages.

Non-Final Office Action issued Jun. 4, 2008 for U.S. Appl. No. 11/408,065.

An Office Action dated May 13, 2010, which issued during the prosecution of Applicant's U.S. Appl. No. 11/845,435.

An Office Action dated Oct. 26, 2004, which issued during the prosecution of U.S. Appl. No. 10/326,726.

An International Preliminary Report on Patentability dated Jul. 19, 2011 which issued during the prosecution of Applicant's PCT/IL2009/000724.

An Office Action dated May 28, 2004, which issued during the prosecution of U.S. Appl. No. 10/326,726.

An Office Action dated Apr. 10, 2012, which issued during the prosecution of U.S. Appl. No. 12/758,150.

An International Search Report and a Written Opinion both dated Apr. 30, 2012, which issued during the prosecution of Applicant's PCT/US2012/020142.

Van Ess, Dave; "Capacitive touch switches for automotive applications", http://www.automotivedesignline.com/, Feb. 2006.

Victor Kremin, et al., "Capacitive sensing—waterproof capacitance sensing", Cypress Perform, Dec. 2006.

A Notice of Allowance dated Sep. 10, 2010, which issued during the prosecution of Applicant's U.S. Appl. No. 11/845,435.

An Office Action dated May 11, 2012, which issued during the prosecution of U.S. Appl. No. 12/355,857.

An Office Action dated Oct. 16, 2012, which issued during the prosecution of U.S. Appl. No. 12/355,857.

* cited by examiner

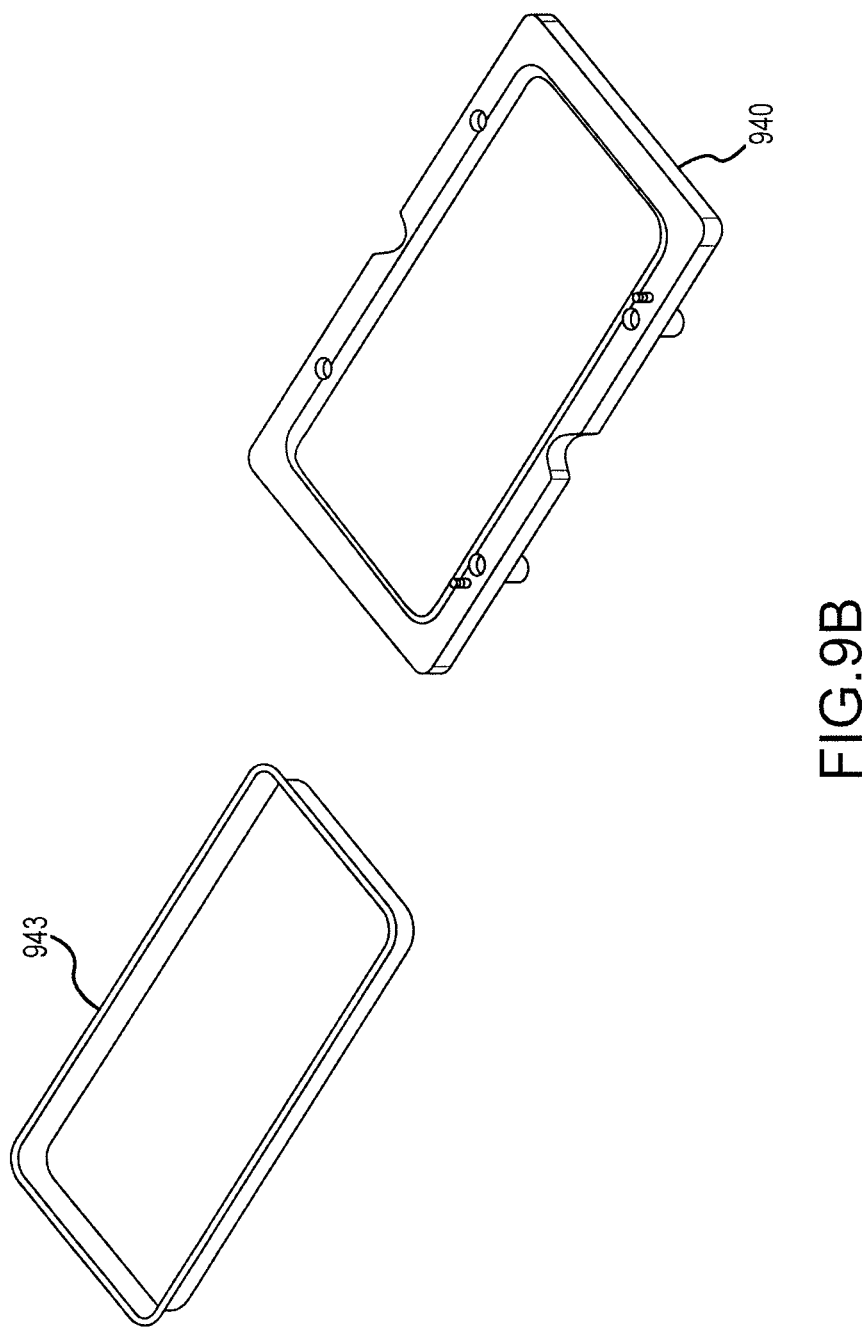

KEYPAD MEMBRANE SECURITY

CROSS REFERENCE TO RELATED APPLICATION

This application claims priority to and benefit of U.S. Provisional Application No. 61/163,785, filed on Mar. 26, 2009, and entitled "KEYPAD MEMBRANE SECURITY", which is hereby incorporated by reference.

FIELD OF INVENTION

The present invention relates, generally, to point of sale ("POS") terminals incorporating keypads, and more particularly to systems and methods of security associated with keypad membranes in POS terminals.

BACKGROUND OF THE INVENTION

Point of sale ("POS") terminals enable convenient electronic payment for many products and services. For example, consumers holding cards associated with a charge, credit, debit, or loyalty accounts may pay for a purchase simply by using the card with a POS terminal located at stores, restaurants, and other locations where the products and services are being purchased. During the transaction, as part of the process the customer (card holder) may make payment selections on the terminal, and in addition for various transactions, often the customer's PIN or other identifying information is entered on a keypad.

The keypad is often connected to a processor which contains or has access to sensitive information. It is possible for an unauthorized person to obtain the sensitive information by inserting a probe through the keypad and making a connection with the processor or similar electronic component. Thus, a need exists for a system and method of securing sensitive information and detecting attempted probes through the keypad of a POS terminal.

SUMMARY OF THE INVENTION

In accordance with various aspects of the present invention, a method and device for a keypad protection circuit is disclosed. In an exemplary embodiment, a security sensor is present in a POS terminal between the keypad and a processor. The security sensor is configured to detect an unauthorized probe through the keypad and implement a security protocol. In an exemplary embodiment, the security sensor is a serpentine conductive circuit screen printed on the polyester film. The serpentine conductive circuit may cover almost all of the polyester film. For example, the serpentine conductive circuit may cover 90% to 100% of the film. Furthermore, in an exemplary embodiment, the serpentine conductive circuit limited to a section of the polyester film. For example, the serpentine conductive circuit may be on only ¼ of the film. This embodiment has the advantage of printing the serpentine conductive circuit on the critical security areas and leaving the non-critical areas with blank polyester film.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIGS. 9A-9B illustrate a detailed view of an exemplary security cover.

DETAILED DESCRIPTION

The present invention may be described herein in terms of various functional components and various processing steps. It should be appreciated that such functional components may be realized by any number of hardware or structural components configured to perform the specified functions. For example, the present invention may employ various integrated components, such as transistors, amplifiers, buffers, and logic devices comprised of various electrical devices, e.g., resistors, capacitors, diodes and the like, whose values may be suitably configured for various intended purposes. Further, it should be noted that while various components may be suitably coupled or connected to other components within exemplary circuits, such connections and couplings can be realized by direct connection between components, or by connection through other components and devices located therebetween.

Figure 1:
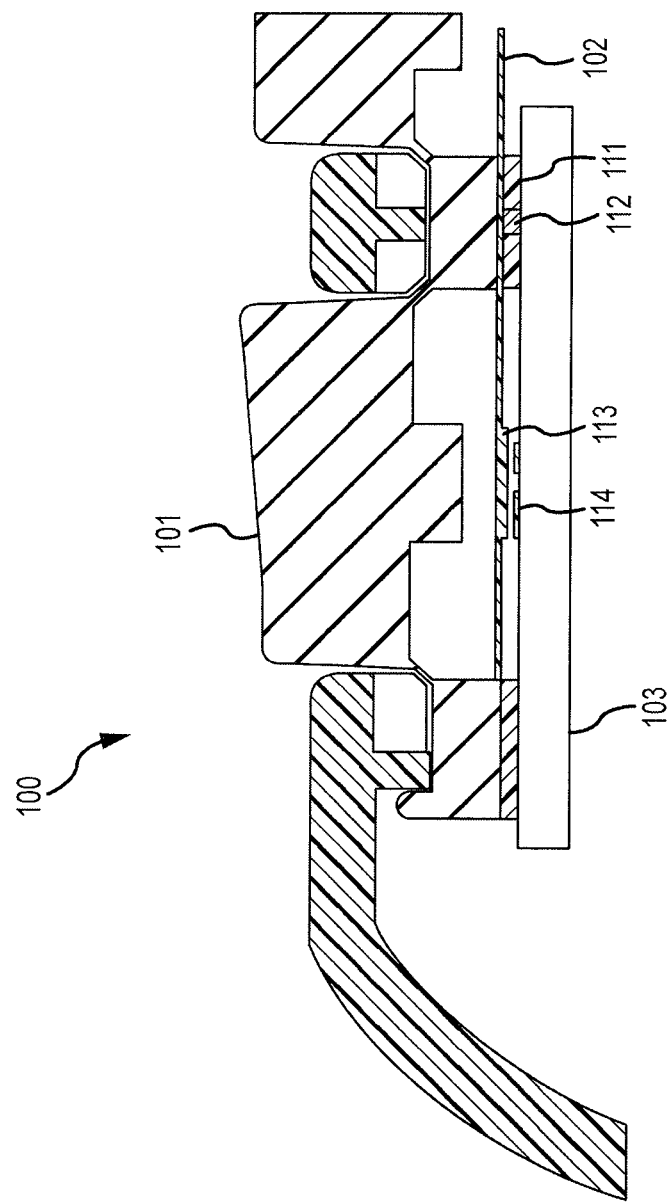
FIG. 1 illustrates an exemplary POS device.

In accordance with an exemplary embodiment and with reference to FIG. 1, a keypad of a point-of-sale ("POS") device 100 comprises a rubber keypad 101, a secure membrane 102, and a processor printed circuit board ("PCB") 103. In another exemplary embodiment, POS device 100 further comprises a spacer layer 111 between secure membrane 102 and processor PCB 103, a via 112 in spacer layer 111, and a switch shorting bar 113 on the bottom side of secure member 102 and directly across from switch contacts 114 on processor PCB 103. In yet another embodiment, switch contacts 114 are included on a separate circuit layer. To perform a transaction, rubber keypad 101 may be pressed in order to provide various information, such as a personal identification number ("PIN") or a security verification code. The information is typically encrypted and transmitted to facilitate completion of the transaction.

Figure 2:
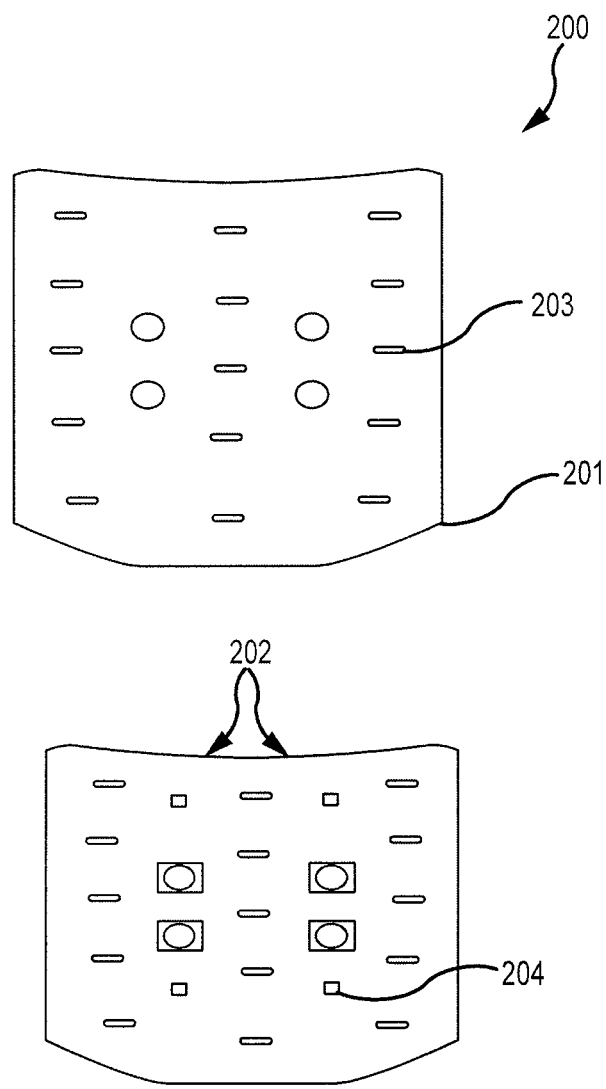
FIG. 2 illustrates both sides of an exemplary secure membrane.

In an exemplary embodiment and with reference to FIG. 2, a secure membrane 200 comprises an opaque polyester film 201 on a first side and at least one printed security circuit 202 on a second side. In another exemplary embodiment, secure membrane 200 further comprises at least one printed shorting contact 203, and at least one dielectric layer (not shown) between security circuit 202 and shorting contact 203. In yet another embodiment, secure membrane 200 further comprises security circuit contact pads 204 on a second side.

In one embodiment, security circuit 202 is a serpentine conductive circuit screen printed on the polyester film. The serpentine conductive circuit may cover almost all of the polyester film. For example, the serpentine conductive circuit may cover 90% to 100% of the film. In another embodiment, the serpentine conductive circuit may cover 95% or more of the film. In yet another embodiment, the serpentine conductive circuit may cover 98% or more of the film. However, any suitable percentage of coverage may be used. Furthermore, in an exemplary embodiment, the serpentine conductive circuit limited to a section of the polyester film. For example, the serpentine conductive circuit may be on only ¼ of the film. This embodiment has the advantage of printing the serpentine conductive circuit on the critical security areas and leaving the non-critical areas with blank polyester film.

The secure membrane is configured to provide a layer of security for the POS terminal keypad. In an exemplary embodiment, a break or short in the printed security circuit is detected by a microprocessor and triggers a security response. The security response could be deleting all, or a portion, of the information contained in the POS terminal. In an exemplary embodiment, deleting information results in the information being zeroed out and irretrievable. In accordance with the exemplary embodiment, the POS terminal is sufficiently secure to meet Payment Card Industry ("PCI") 2.0 standards. Furthermore, in exemplary embodiments the security response includes at least one of logging the event, issuing a silent alarm, and providing notification to an owner and/or third party.

In an exemplary embodiment of the secure membrane, the film is opaque polyester with all printing on a first surface. Furthermore, there may be a printed dielectric layer between switch shorting contacts 203 and security circuit 202. The method of manufacturing includes screen printing the circuit and conductive silver ink, screen printing a double dielectric layer with no dielectric material over the security circuit contact pads, and screen printing switch shorting contacts with conductive silver ink. In an exemplary embodiment, the conductive silver ink has resistive properties, allowing for measuring of resistivity for security monitoring. The conductive silver ink may include carbon to provide the resistive properties.

Figure 3:
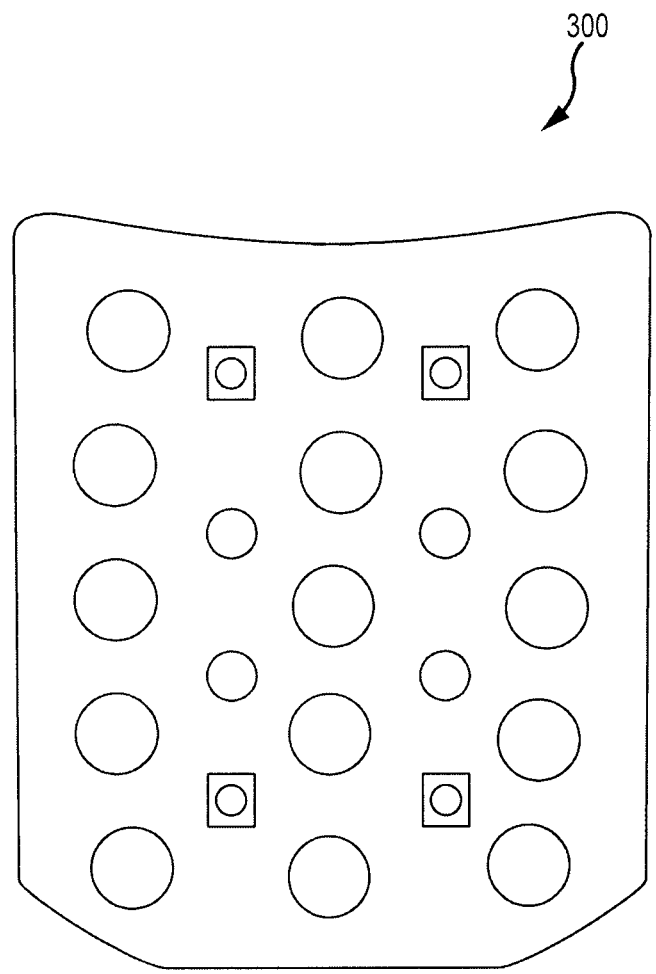
FIG. 3 illustrates an exemplary spacer layer.

In an exemplary embodiment and with reference to FIG. 3, a spacer layer 300 is located between a secure membrane and a circuit layer. For example, spacer layer 300 may be 0.4 mm polycarbonate film with 8.0 mm holes punched through at each switch position to facilitate connection between the switch shorting contacts in the secure membrane and switch contacts in the circuit layer. The spacer layer 300 may also have multiple via's that are configured to connect the circuits on the secure membrane with the PCB. As an example, spacer layer 300 may have four vias as illustrated in FIG. 3. In various embodiments, a clamp or compressive force may be used to assure electrical conductivity. Furthermore, in an exemplary embodiment, spacer layer 300 is 0.5 mm polycarbonate film with conductive adhesive on both sides.

Figure 4A:
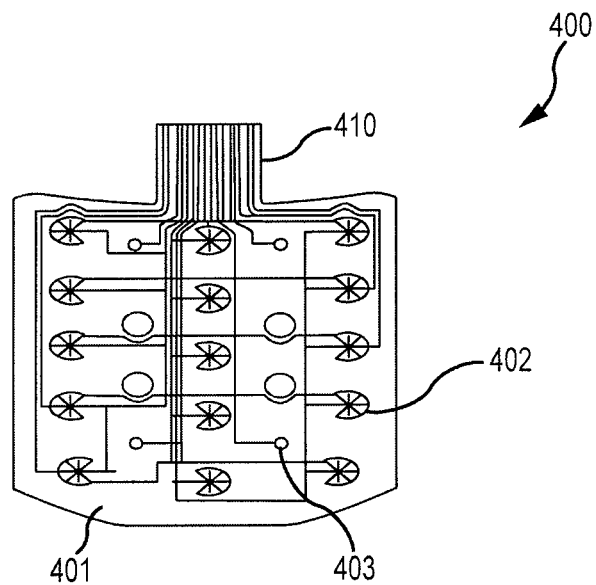
FIGS. 4A-4B illustrate an example of a circuit layer with an external flex tail.
Figure 4B:
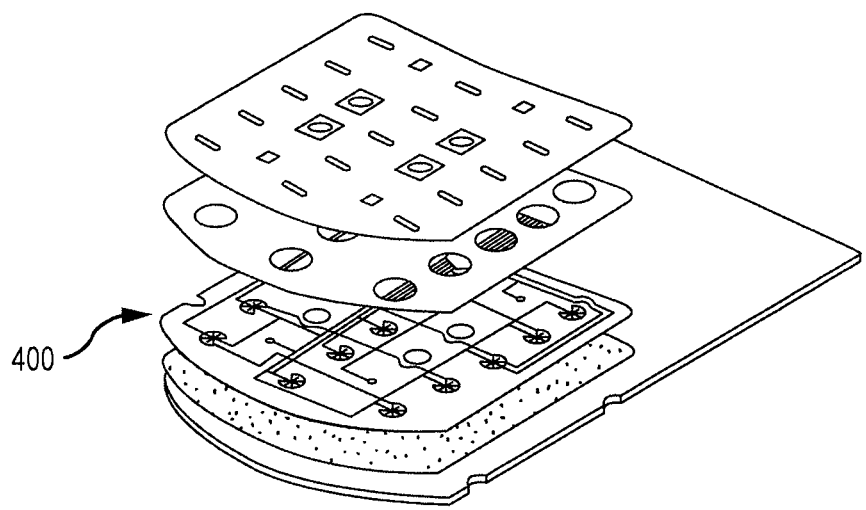

In an exemplary embodiment and with reference to FIGS. 4A and 4B, a circuit layer 400 comprises a membrane layer 401 that is polyester material with all printing on a single side. In one exemplary embodiment, circuit layer 400 comprises fifteen switch contacts 402 in a 3 by 5 matrix which are configured to align with the holes in spacer layer 300. In a first embodiment, circuit layer 400 terminates into a flex tail 410 which exits along one edge of the circuit layer membrane 401, wraps around or through a PCB and terminates in a ZIF connector on the backside of the PCB with the secure area. In this first embodiment, membrane layer 401 comprises at least one via 403 that connects to at least one contact pad in a security circuit layer. In an exemplary embodiment, the fifteen switch contacts 402 are connected to flex tail 410, as well as four vias 403. Flex tail 410 may have sixteen contacts that are 1 mm wide on a 1 mm pitch.

Figure 5A:
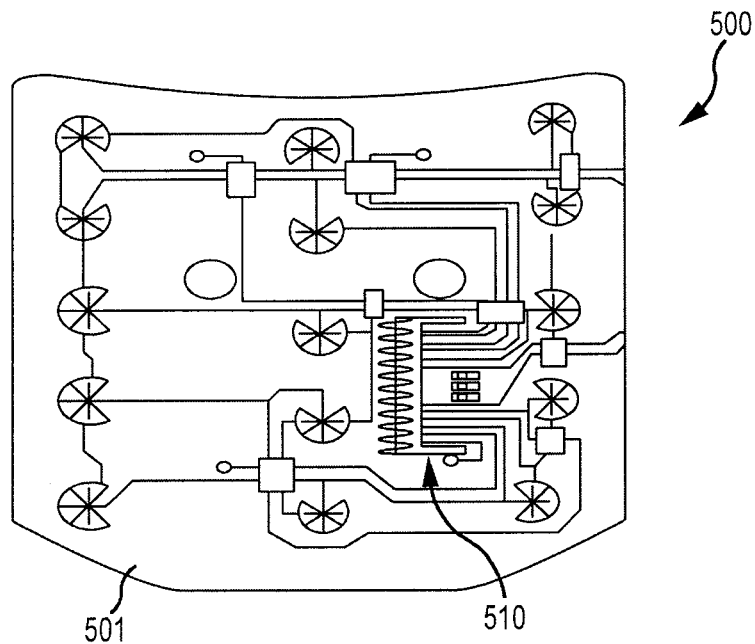
FIGS. 5A-5B illustrate an example of a circuit layer with an internal flex tail.
Figure 5B:
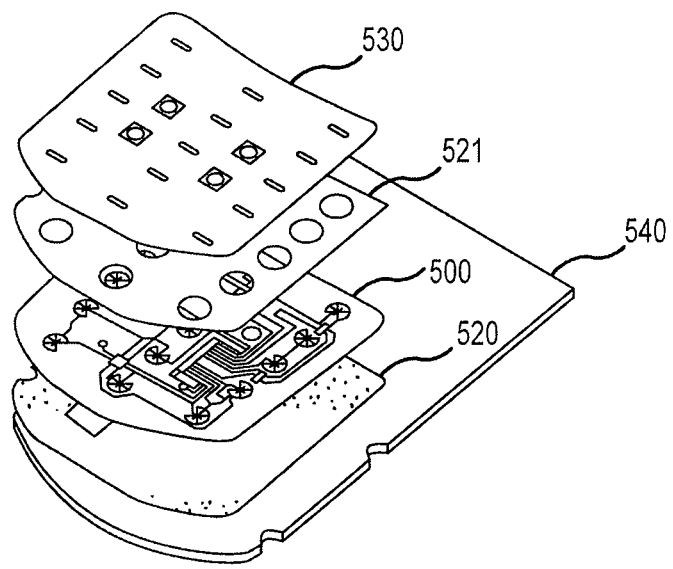

In a second embodiment and with reference to FIGS. 5A and 5B, a keyswitch circuit layer 500 terminates into an interior flex tail 510 that is built within the perimeter of a circuit layer membrane 501. In this embodiment, interior flex tail 510 connects to a low profile spring contact connector (not shown) that is attached to a PCB 540. In an exemplary embodiment, a first spacer layer 520 is added to allow for the thickness of the spring contact connector, which is 2.0 mm for example. The first spacer layer 520 can be made from injection molded plastic. Furthermore, in yet another exemplary embodiment, a second spacer layer 521 is placed between keyswitch circuit layer 500 and a security circuit layer 530. Security circuit layer 530 is substantially similar to secure membrane 200 and will not be discussed in additional detail.

Figure 6A:
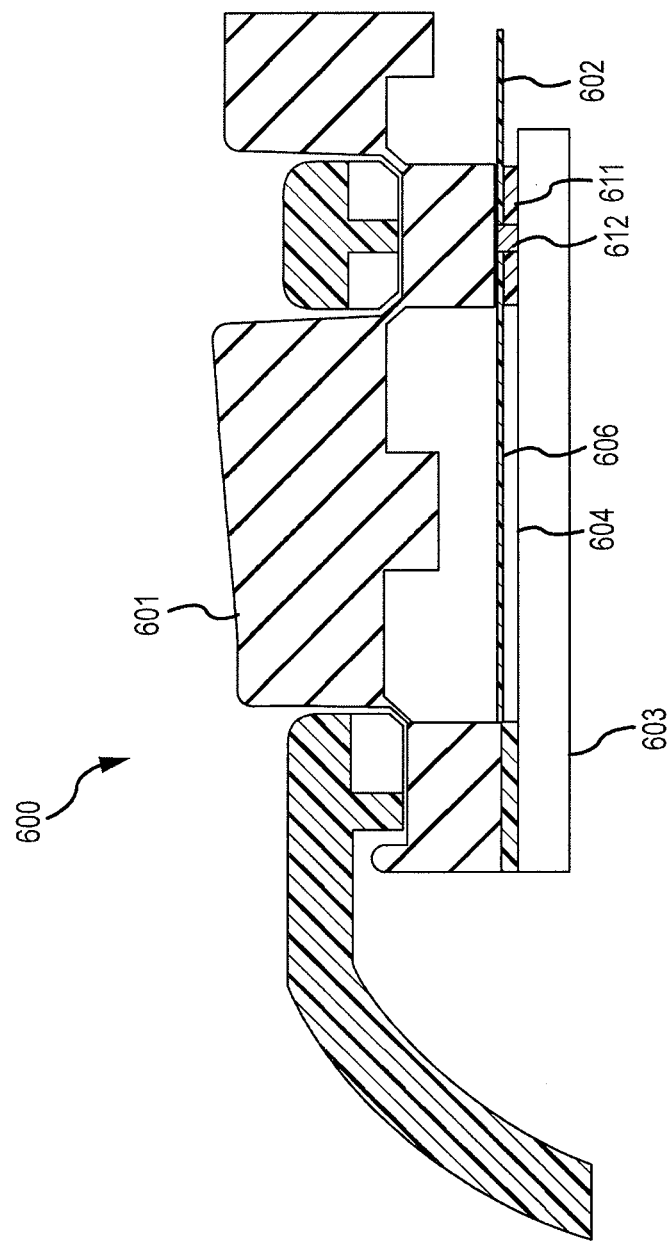
FIGS. 6A-6B illustrate exemplary POS devices with two-layer construction.
Figure 6B:
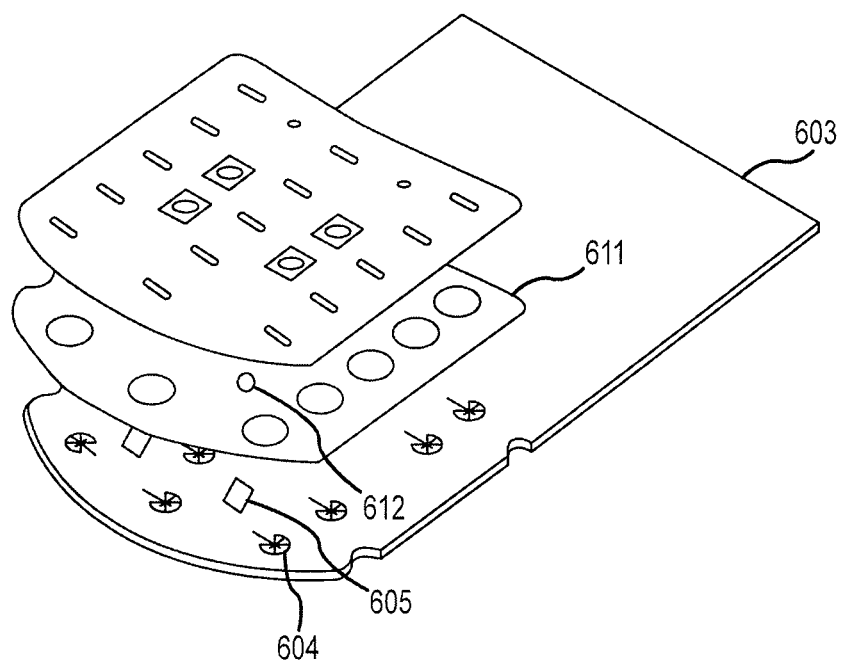

In a first embodiment of POS device keypad and with reference to FIGS. 6A and 6B, a rubber keypad device 600 has a two layer construction comprising keypad switch contacts 604 printed on a PCB 603, such that keypad switch contacts 604 are integrated in PCB 603. In an exemplary embodiment, keypad switch contacts 604 are printed on PCB 603. Furthermore, in an exemplary embodiment, a secure membrane 602 connects to PCB 603 using a Z-axis adhesive in one or more places. The Z-axis adhesive may be used to electrically connect signals from PCB 603 to secure membrane 602. In an exemplary embodiment, keypad switch contacts 604 on PCB 603 are coated (over printed) with carbon ink, which is configured to increase the useful life of switch contacts 604 with a switch shorting bar 606. Switch shorting bar 606 is a conductive area that facilitates closing a circuit in response to the keypad being pressed. In an exemplary embodiment, switch shorting bar 606 is integrated into secure membrane 602. In another exemplary embodiment, switch shorting bar 606 are printed on secure membrane 602. In another exemplary embodiment, rubber keypad device 600 further comprises a spacer layer 611 with vias 612, and PCB 603 having via contact pads 605 and keypad switch contacts 604. In an exemplary embodiment, spacer layer 611 is laminated to secure membrane 602. Furthermore, in an exemplary embodiment secure membrane 602 has printed silver circuits on the backside of spacer layer 611.

In accordance with an exemplary embodiment, pressing rubber keypad 601 exerts a downward force on secure membrane 602. The integrated switch shorting bar 606 makes contact with keypad switch contacts 604, completing a circuit. In response, a signal passes to PCB 603 indicating that a particular section of rubber keypad 601 was pressed. In general, the functioning of a keypad to generate signals based on user input is well known in the art and will not be discussed in detail.

An exemplary method of assembly of a two layer construction includes laminating a spacer layer to a security circuit layer. The backside of the spacer layer may comprise a release liner that protects the conductive adhesive. The release liner is removed to facilitate installation and the security membrane is aligned with a PCB and then laminated into position.

Figure 7A:
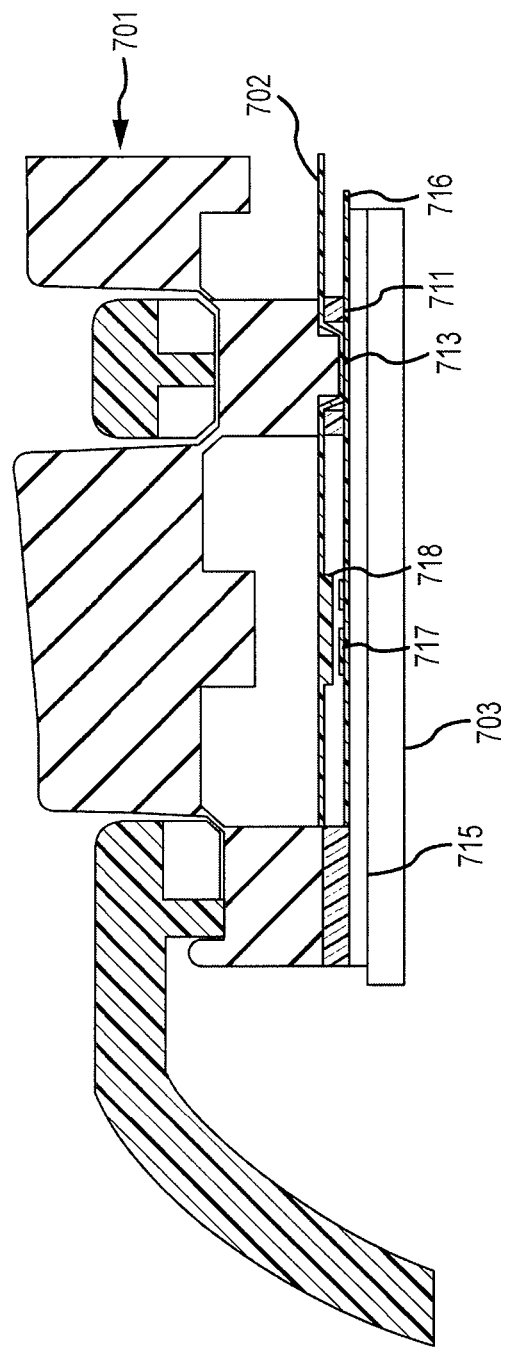
FIGS. 7A-7B illustrate exemplary POS devices with three-layer construction.
Figure 7B:
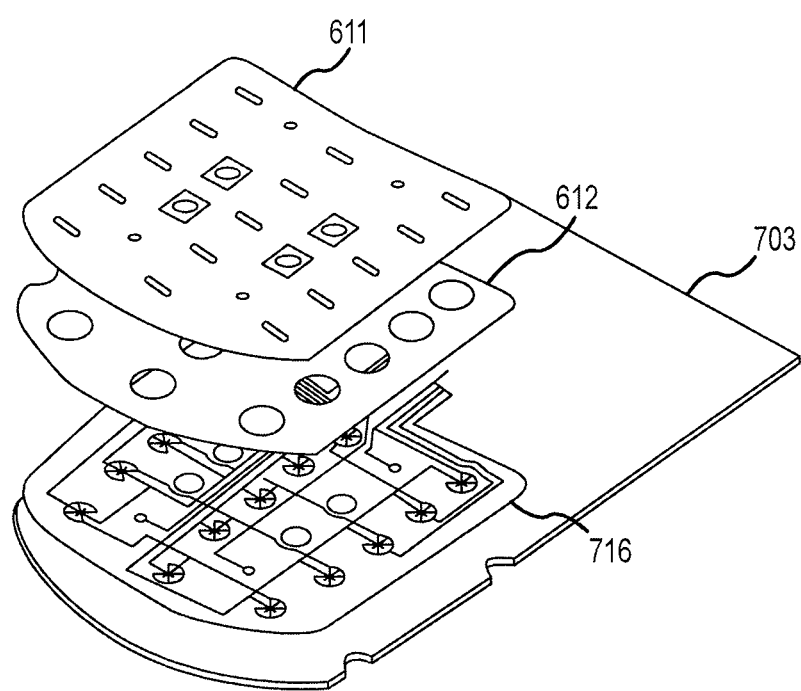

In a second embodiment of POS device keypad and with reference to FIGS. 7A and 7B, a rubber keypad device 700 has a three layer construction comprising keypad switch contacts 717 printed on a separate switch contact layer 716, which is in contact with a PCB 703. The three layer construction may have a longer cycle life than the two layer construction. In an exemplary embodiment, rubber keypad device 700 comprises a rubber keypad 701, a secure membrane 702, a membrane spacer layer 711 between secure membrane 702 and a contact pad 713 from secure membrane 702 to switch contact layer 716, a switch shorting bar 718 on the backside of secure membrane 702, switch contacts 717 on switch contact layer 716, a bottom spacer layer 715 beneath switch contact layer 716, and keypad PCB 703 beneath bottom spacer layer 715.

An exemplary method of assembly of a three layer construction includes laminating together a security circuit layer, a spacer layer, and a circuit layer. In an exemplary embodiment, the backside of the circuit layer has a release liner to protect a conductive adhesive, which is removed during installation, and the laminated group is aligned with a PCB and laminated into position. A roller can be used to properly bond the conductive adhesive layer to the PCB. Furthermore, there are several options to interconnect to the PCB.

Figure 8:
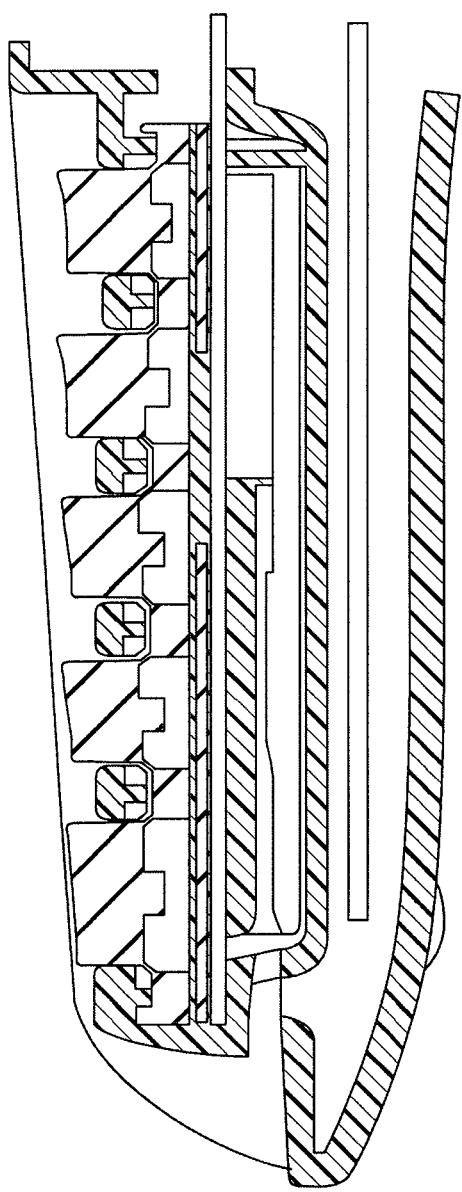
FIG. 8 illustrates an exemplary POS device with a security cover.

The secure membrane can protect components in a POS terminal other than a processor, such as a chip card reader or MSR Head Protection. Furthermore, in an exemplary embodiment, the secure membrane also includes additional security switches and circuits. As shown in FIG. 8, a chip card connector and associated electronics may be enclosed by secure membranes and thus protected.

Figure 9A:
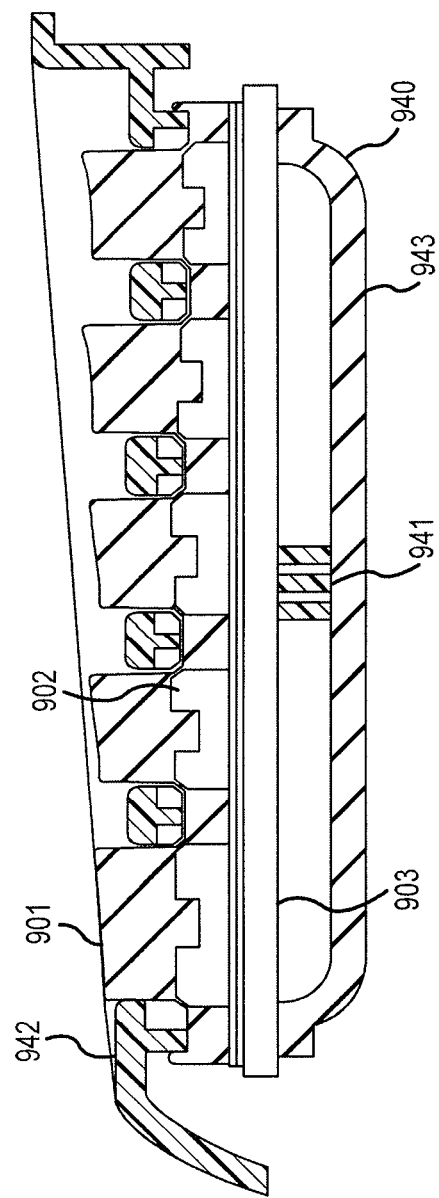

In accordance with the exemplary embodiment, the present invention is suited for POS terminals where all the circuit components that need to be protected are located on the back side on the processor PCB and opposite the rubber keypad. In other exemplary embodiments, the circuit components that need to be protected may be located all on the front side on the processor PCB, or may be located on both the front and back side of the processor PCB. Circuit components that need protection are generally the components that either store or have access to sensitive information. With reference to FIGS. 9A and 9B, an injection molded security cover 940 is used to protect the circuit components by covering the sensitive components and circuitry on the underside of a processor PCB 903. In an exemplary embodiment, security cover 940 comprises a pair of conductive interlaced circuits 943 that cover a substantial portion of the inside surface of the security cover. An interconnect from interlaced circuits 943 to processor PCB 903 is via at least one or two elastomer connectors 941, also referred to as zebra strips. The zebra strips 941 can be mounted in a small molded plastic holder that is affixed to processor PCB 903 in order to maintain alignment. In one embodiment, security cover 940 attaches to an upper enclosure 942. For example, security cover 940 may attach using screws, nails, staples, adhesive, pressure, fastening devices, or other suitable means as now known or hereinafter devised.

Method of Fabricating a Security Cover

In the exemplary method, a security circuit is printed with a conductive and flexible silver based ink on a thin polycarbonate film. For example, the polycarbonate film may be 0.2-0.5 millimeters thick. In another embodiment, the polycarbonate film may be 0.1-0.7 millimeters thick, depending on the number of layers. The film undergoes a heat cure cycle and hydro-formed to a shape identical to the inside shape of the security cover. Furthermore, the security circuit is tested to assure continuity. The unused material around the perimeter may be removed after the film is formed. Place the film in an injection mold, where the film is configured to align and fit over the core side of the mold. Then the mold is closed and a polycarbonate resin is injected into the mold. The molded part is removed after sufficient cooling. At the end of the process, the film is an integral part of the molded plastic cover with the security circuit on the interior surface of the plastic cover.

The present invention has been described above with reference to various exemplary embodiments. However, those skilled in the art will recognize that changes and modifications may be made to the exemplary embodiments without departing from the scope of the present invention. For example, the various exemplary embodiments can be implemented with other types of power supply circuits in addition to the circuits illustrated above. These alternatives can be suitably selected depending upon the particular application or in consideration of any number of factors associated with the operation of the system. Moreover, these and other changes or modifications are intended to be included within the scope of the present invention.

What is claimed is:

1. A point-of-sale device comprising:
a rubber keypad;
a printed circuit board (PCB) configured to at least one of store or access transaction data;
a secure membrane located between the rubber keypad and the printed circuit board, the secure membrane being configured to detect an interruption in a conductive circuit of the secure membrane;
at least one switch contact connected to the PCB;
a spacer layer connected to the PCB on a first side and to the secure membrane on a second side, the spacer layer comprising a via; and
a switch shorting bar attached to the secure membrane adjacent the PCB, the switch shorting bar being spaced apart from the at least one switch contact.

2. The point-of-sale device of claim 1, wherein the conductive circuit is a serpentine conductive circuit printed on at least one side of the secure membrane.

3. The point-of-sale device of claim 2, wherein the serpentine conductive circuit covers at least 90% of the secure membrane.

4. The point-of-sale device of claim 1, wherein user data is entered via the rubber keypad in response to the at least one switch contact electrically connecting to the switch shorting bar.

5. A point-of-sale device comprising:
a rubber keypad;
a printed circuit board (PCB) configured to at least one of store or access transaction data;
a secure membrane located between the rubber keypad and the printed circuit board, wherein the secure membrane is configured to detect an interruption in a conductive circuit of the secure membrane;
at least one switch contact integrated into the PCB;
a spacer layer connected to the PCB on a first side and the secure membrane on a second side, the spacer layer comprising a via; and
a switch shorting bar integrated into the secure membrane adjacent the PCB, the switch shorting bar being spaced apart from the at least one switch contact.

6. The point-of-sale device of claim 5, wherein the at least one switch is integrated into the PCB by printing the at least one switch onto the PCB, and wherein the switch shorting bar is integrated into the secure membrane by printing the switch shorting bar onto the secure membrane.

7. A point-of-sale device comprising:
a rubber keypad;
a printed circuit board (PCB) configured to at least one of store or access transaction data;
a secure membrane located between the rubber keypad and the printed circuit board, wherein the secure membrane is configured to detect an interruption in a conductive circuit of the secure membrane;
a switch contact layer comprising at least one switch contact;
a switch shorting bar attached to the secure membrane adjacent the switch contact layer, the switch shorting bar being spaced apart from the switch contact layer;
a first spacer layer connected to the switch contact layer on a first side and the secure membrane on a second side; and a second spacer layer connected to the PCB on a first side and the switch contact layer on a second side.

8. The point-of-sale device of claim 7, wherein the secure membrane is non-planar.

9. The point-of-sale device of claim 1, further comprising a security cover covering the PCB, wherein the security cover is positioned opposite the rubber keypad.

10. The point-of-sale device of claim 5, wherein the conductive circuit is a serpentine conductive circuit printed on at least one side of the secure membrane.

11. The point-of-sale device of claim 10, wherein the serpentine conductive circuit covers at least 90% of the secure membrane.

12. The point-of-sale device of claim 5, further comprising a security cover covering the PCB, wherein the security cover is positioned opposite the rubber keypad.

13. The point-of-sale device of claim 7, wherein the conductive circuit is a serpentine conductive circuit printed on at least one side of the secure membrane.

14. The point-of-sale device of claim 13, wherein the serpentine conductive circuit covers at least 90% of the secure membrane.

15. The point-of-sale device of claim 7, further comprising a security cover covering the PCB, wherein the security cover is positioned opposite the rubber keypad.

* * * * *